April 27, 1926.
H. R. SCHULER
DIRECTION INDICATOR
Filed April 13, 1925
1,582,087
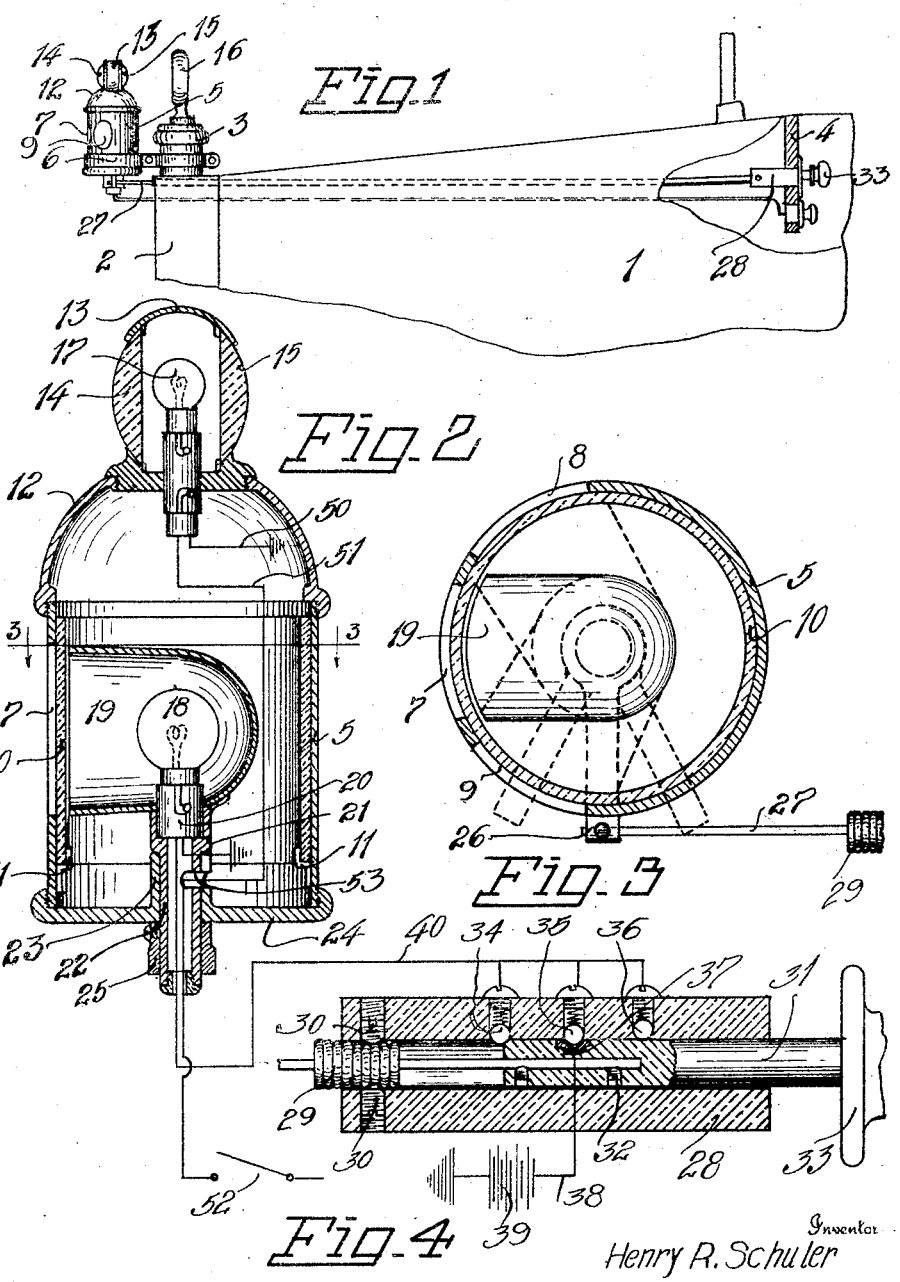
Inventor
Henry R. Schuler
By Herbert E. Smith
Attorney Patented Apr. 27, 1926.

1,582,087

UNITED STATES PATENT OFFICE.

HENRY R. SCHULER, OF SPOKANE, WASHINGTON.

DIRECTION INDICATOR.

Application filed April 13, 1925. Serial No. 22,523.

*To all whom it may concern:*

Be it known that I, HENRY R. SCHULER, a citizen of the United States, residing at Spokane, in Spokane County and State of Washington, have invented certain new and useful Improvements in Direction Indicators, of which the following is a specification.

My present invention relates to improvements in direction indicators of the illuminated and manually operated type for use on automotive vehicles. The invention involves the use of a direction signal located on a convenient part of the vehicle, preferably at the front on the radiator, and includes a fixed lantern or casing with windows and having therein a rotatable member, which when electrically illuminated will direct a light ray or beam in a selected direction to indicate the direction of travel of the vehicle.

By means of the utilization of the device of my invention the direction indicator may manually be pointed to the front, to the right, or to the left, selectively, and an electric lamp automatically illuminated to throw a light beam in the selected direction.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view of a portion of an automobile hood and radiator, showing the application thereto of the device of my invention.

Figure 2 is an enlarged vertical sectional view of the lantern or casing showing also the operating parts of its interior.

Figure 3 is a horizontal sectional view at line 3—3 of Figure 2.

Figure 4 is a longitudinal sectional view of the housing for the manually operated device for controlling the indicator and for making the circuits for illumination.

In order that the utility and general arrangement of the parts may readily be understood I have shown in Figure 1 a portion of the hood 1, radiator 2, radiator cap 3 and the instrument board 4 of a standard type of automobile.

The indicator is preferably carried in a conspicuous place at the front of the car, as on the radiator cap, and the stationary lantern includes a cylindrical casing 5 which is clamped to the radiator cap by a bracket 6 which is fashioned to encase the cap and casing and be rigidly secured to the cap to support the lantern.

The lantern preferably is provided with three openings or windows as 7 at the front, 8 at the right side and 9 at the left side of the casing, and a glass cylinder 10 fitted within the interior of the casing forms transparent walls or windows for these openings. The glass cylinder is supported at its bottom edge within the casing by means of brackets or lugs 11 attached to the inner face of the casing wall and spaced at suitable intervals around the casing for the purpose.

The lantern is fashioned with an ornamental dome 12 and above this dome is provided a hollow cap 13 having a front lens 14 which may be of blue colored or green colored glass for a caution signal and a white or clear lens 15 at the rear of the cap to illuminate the motometer 16. Within the cap an electric lamp 17 is supported and these auxiliary lights may normally be illuminated, is desired, but of course under control of a switch.

The three windows of the lantern are selectively illumined from an electric lamp 18 located centrally in the casing and encased by a hood-reflector 19, disposed horizontally in the casing and with its open free end adapted to register with either of the windows. The socket 20 of the lamp is supported in a socket head 21 at the upper end of a tubular stem 22 arranged in vertical position in the center of the lantern below the lamp and hood-reflector. The tubular stem, with its lamp and hood-reflector, is rotatable, and the stem is supported in a bearing sleeve 23 that projects centrally upward from the base or bottom 24 of the lantern. The lower end of the stem projects through the bottom of the lantern and on the exterior of this end of the stem a collar 25 is fixed, to permit rotation of the stem, but prevent longitudinal displacement of the stem from its bearing sleeve.

This retaining collar 25 is provided with a crank arm 26 extending laterally therefrom in a horizontal plane and at the free end of the arm a cable 27 is attached, which cable passes through the front of the radiator and thence under the hood to the instrument board 4 of the automobile.

A housing or tubular member 28 is supported in an opening in the instrument board and rigidly supported thereon in horizontal position, and a guide collar 29 at the front end of this housing supports the cable which passes therethrough and into the housing. The guide collar is fixed in the housing by means of set screws or bolts 30 and preferably projects forward of the end of the housing as seen in Figure 4.

Within the housing is carried a slide bar 31 to which the end of the cable is attached at 32, and it will be apparent that by means of the handle 33 on the inner end of the bar (when grasped by the car driver) the cable, which is of sufficient rigidity for the purpose, may be pushed or pulled to swing the rotatable direction indicator to the right or left respectively as indicated by dotted lines in Figure 3.

During the daylight, if the indicator is not to be used, the indicator is not illumined, and under normal conditions the hood remains in full line position in Figure 3, that is pointing directly toward the front, and in this position the slide bar is retained or locked, as is also the case with the indicator in either of the other two positions. The locking device however is a resilient one and permits, by application of force or pressure, the locked part to be released by manipulating the handle.

By actuating the slide bar a lighting circuit is closed for the purpose of illuminating the indicator, and for this purpose the slide bar is provided with means for coaction with any one of three circuit makers 34, 35 or 36, which as disclosed in Figure 4 comprises spring pressed balls of conducting material located in sockets extending radially from the bore of the tubular housing. The springs urge the balls toward the axial line of the housing but the slide bar prevents them from being displaced from their sockets, and terminal screws close the outer ends of the sockets and retain the springs in operative position.

The slide bar carries a single contact point or circuit maker for selective use with any one of the three stationary contact points of the housing, and this single contact point is in the form of a metallic cup or conductor 37 embedded in the surface of the slide bar in line with the three alined stationary contact points or balls. In the diagram of the electrical connections in Figures 2 and 4 a conductor wire 38 leads from the cup 37 to the battery 39 and the battery is provided with a grounded wire as shown. A conductor wire 40 is connected to the terminals or screws of the stationary contact points and leads to the lamp 18 and from the lamp this extended wire is grounded on the lamp casing.

The auxiliary lamp 17 has an electric wire or conductor 50 grounded on the dome of the casing and its other lead wire 51 returns through a control switch 52 to complete both the circuits for the auxiliary lamp and for the indicator lamp, slots or openings 53 being indicated in the stem and bearing sleeve for the accommodation of the wires.

From this description taken in connection with the drawings it will be apparent that if desired the normally positioned lamp 18 and its hood-reflector may direct a light beam through the front window 7. In this position the control switch 52 is of course closed and the circuit is completed through the two points or contact members 35 and 37. The hood prevents any portion of the interior of the lantern from being illuminated except the window 7 and the beam of light from the lamp passes through this window as an indication that the car is to travel straight ahead. In this normal position the slide bar 31 is retained by coaction of the spring pressed ball 35 and cup 37 which also performs the function of closing the lamp circuit to illuminate the lamp. If a turn is to be made to the left the handle is pulled to bring the hood-reflector around to dotted position in Figure 3 to illuminate the window 9 and exclude the light from the remainder of the interior of the lantern. The light circuit is closed by contact of parts 36 and 37 and the indicator is retained in this position by the mechanical contact or engagement of these parts.

Having thus fully described my invention, what I claim as new and desire to secure by Letters Patent is—

In a direction indicator, the combination with a cylindrical lantern casing having a plurality of peripherally spaced window apertures in the walls thereof and formed with a closed bottom provided with a vertical bushing extending upwardly therefrom within the casing and integral therewith, of a rotatable supporting post extending upwardly within said bushing and journaled therethrough, said post having an annular head resting on the top of said bushing, a reflector hood formed integral with the upper end of said post and extending within the casing to the walls thereof for registry over a single window aperture, illuminating means carried by the said post within said hood, and a distant control member operatively connected with said post for selectively rotating said post to dispose said hood in selective alinement with any of said window apertures.

In testimony whereof I affix my signature.

HENRY R. SCHULER.